(12) United States Patent
Kotaka (10) Patent No.: US 7,901,226 B2
(45) Date of Patent: Mar. 8, 2011

(54) CONNECTOR OF A SIMPLE STRUCTURE HAVING A LOCKING MECHANISM

(75) Inventor: Kenichi Kotaka, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 12/589,667

(22) Filed: Oct. 27, 2009

(65) Prior Publication Data

US 2010/0112846 A1    May 6, 2010

(30) Foreign Application Priority Data

Oct. 31, 2008    (JP) .................................. 2008-280854

(51) Int. Cl.
H01R 13/62    (2006.01)
(52) U.S. Cl. ........................................ 439/160; 439/372
(58) Field of Classification Search .................. 439/152, 439/157, 160, 352, 372; 385/88, 92
See application file for complete search history.

(56) References Cited

U.S. PATENT DOCUMENTS

| | | | |
|---|---|---|---|
| 6,749,448 B2 * | 6/2004 | Bright et al. .................. | 439/160 |
| 6,752,663 B2 | 6/2004 | Bright et al. | |
| 6,816,376 B2 | 11/2004 | Bright et al. | |
| 6,991,481 B1 * | 1/2006 | Guan et al. ..................... | 439/160 |
| 7,001,217 B2 | 2/2006 | Bright et al. | |
| 7,004,772 B1 * | 2/2006 | Hsiao et al. ................... | 439/160 |
| 7,422,457 B1 * | 9/2008 | Wu ............................... | 439/258 |
| 7,445,485 B1 * | 11/2008 | Wu ............................... | 439/352 |
| 7,466,544 B2 * | 12/2008 | Hardt et al. .............. | 361/679.41 |
| 7,513,693 B2 * | 4/2009 | Wang ............................... | 385/56 |
| 7,766,679 B2 * | 8/2010 | Endou et al. .................. | 439/160 |

FOREIGN PATENT DOCUMENTS

| | | |
|---|---|---|
| JP | 54-31916 | 3/1979 |
| JP | 2005-519452 | 6/2005 |

OTHER PUBLICATIONS

Japanese Office Action dated Jul. 28, 2010 with English translation of relevant parts.

* cited by examiner

Primary Examiner — Thanh-Tam T Le
(74) Attorney, Agent, or Firm — Collard & Roe, P.C.

(57) ABSTRACT

A transceiver connector adapted to be connected to a mating connector having a fitting hole and a latch. A metal hood serving as a housing is configured to be insertable into the fitting hole in an inserting direction. The transceiver connector includes a lever formed from a single metal plate and slidable with respect to the housing in the inserting direction and a detaching direction opposite to the inserting direction. The housing has a locking stepped portion adapted to engage the latch in the detaching direction. The lever has an inclined surface and a latch driving convex portion serving as an engagement releasing portion adapted to release engagement between the latch and the locking stepped portion by sliding of the lever, and a support piece continuous from the latch driving convex portion, folded back, and supported by the housing.

6 Claims, 13 Drawing Sheets

CONNECTOR OF A SIMPLE STRUCTURE HAVING A LOCKING MECHANISM

This application is based upon and claims the benefit of priority from Japanese patent application No. 2008-280854, filed on Oct. 31, 2008, the disclosure of which is incorporated herein in its entirety by reference.

TECHNICAL FIELD

This invention relates to a connector and, in particular, relates to a connector having a locking mechanism.

BACKGROUND ART

In servers or the like in a computer network, use is made of board-connecting connectors intended for high-speed transmission. The connectors of this type include one generally called a transceiver connector.

One example of the transceiver connector is disclosed in Published JP-A-2005-519452 as "Transceiver Module Assembly". The disclosed transceiver module assembly is inserted and fitted into a receptacle assembly mounted on a board and is thereby electrically connected to the board. When the transceiver module assembly is fitted into the receptacle assembly, both are locked together by a standardized locking mechanism so that detachment of the transceiver module assembly is prevented. The locking mechanism comprises a locking element provided in the receptacle assembly and a drive arm provided in the transceiver module assembly. The drive arm is part of an ejector mechanism for ejecting the transceiver module assembly from the receptacle assembly, but in the state where the transceiver module assembly is fitted into the receptacle assembly, the drive arm engages the locking element of the receptacle assembly to prevent the detachment of the transceiver module assembly.

SUMMARY OF THE INVENTION

In the above-mentioned transceiver module assembly, however, there is a problem that the number of components for the locking mechanism is large and the structures and mechanisms of the respective components are complicated, leading to an increase in production cost.

It is therefore an exemplary object of this invention to provide a connector of a simple structure having a locking mechanism.

Other objects of the present invention will become clear as the description proceeds.

According to an aspect of the present invention, there is provided a connector adapted to be connected to a mating connector having a fitting hole and a latch. The connector comprises a housing configured to be insertable into the fitting hole in an inserting direction and a lever formed from a single metal plate and slidable with respect to the housing in the inserting direction and a detaching direction opposite to the inserting direction, wherein the housing has a locking stepped portion adapted to engage the latch in the detaching direction, and wherein the lever comprises an engagement releasing portion adapted to release engagement between the latch and the locking stepped portion by sliding of the lever and a support piece continuous from the engagement releasing portion, folded back, and supported by the housing.

EXEMPLARY EMBODIMENT

Figure 1A:
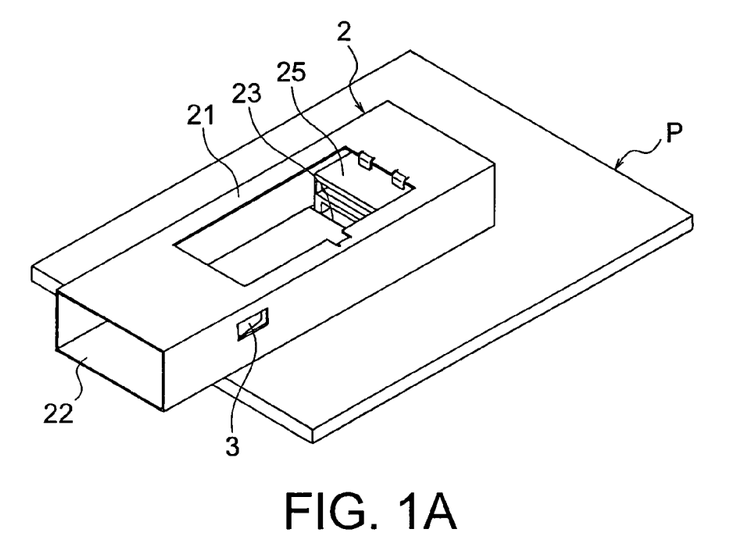
FIG. 1A is a perspective view showing a mating connector in a state where the mating connector is mounted on a board.
Figure 1B:
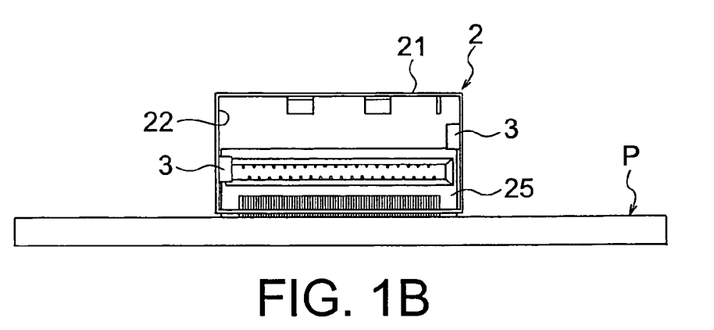
FIG. 1B is an enlarged front view of the same shown in FIG. 1A.
Figure 1C:
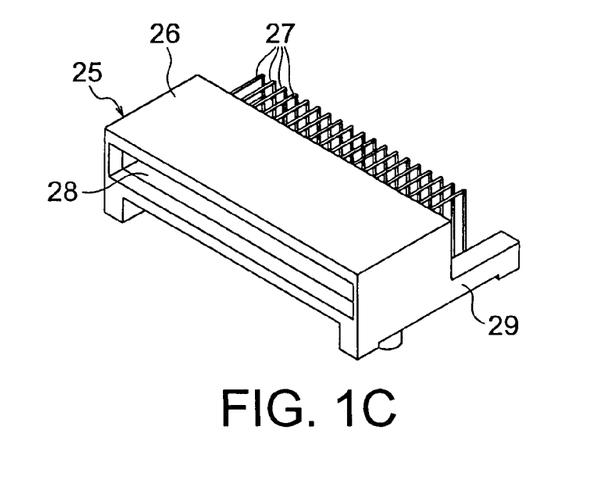
FIG. 1C is a perspective view of a connector portion of the mating connector shown in FIGS. 1A and 1B.

Referring to FIGS. 1A to 1C, a description will first be given of a mating connector serving as a connection object of a transceiver connector.

The mating connector is generally designated by reference symbol 2 and comprises a metal shell 21 serving as a housing and a connector portion 25 attached to the metal shell 21. The metal shell 21 has a hollow rectangular prism shape formed by punching and bending a metal plate and has a fitting hole 22 opened forward for fittingly receiving the transceiver connector. Left and right walls of the metal shell 21 each have a rearward cantilever-like latch 3 formed by cutting and raising a portion of the wall so as to project into the fitting hole 22. When the transceiver connector is fitted into the fitting hole 22, the latches 3 engage the transceiver connector to lock the fitted state.

The connector portion 25 is attached to the metal shell 21 at a deep portion (rear portion) of the fitting hole 22 and comprises an insulator 26 and a plurality of contacts 27 held by the insulator 26. The insulator 26 has a fitting groove 28 for receiving and connecting the transceiver connector and a board attaching seat 29 for attaching to a board P. The board attaching seat 29 projects downward through an opening 23 formed in a lower wall of the metal shell 21 so as to be mountable on the board P. One end of each contact 27 is located in the fitting groove 28 and brought into contact with a corresponding conductive terminal of the received transceiver connector to be electrically connected thereto. Each contact 27 is drawn out through a rear surface of the insulator 26 and then perpendicularly bent downward to penetrate the board attaching seat 29 so that the other end of each contact 27 forms a connection terminal to the board P. The metal shell 21 and the connector portion 25 are fixedly mounted on the board P so that the other ends of the contacts 27 are connected to a circuit of the board P.

Figure 2A:
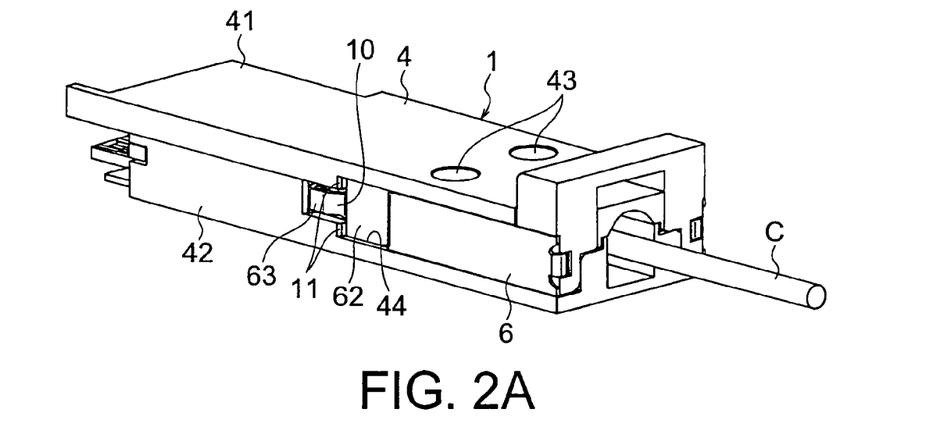
FIG. 2A is a perspective view of a transceiver connector as a connector according to an exemplary embodiment of this invention.
Figure 2B:
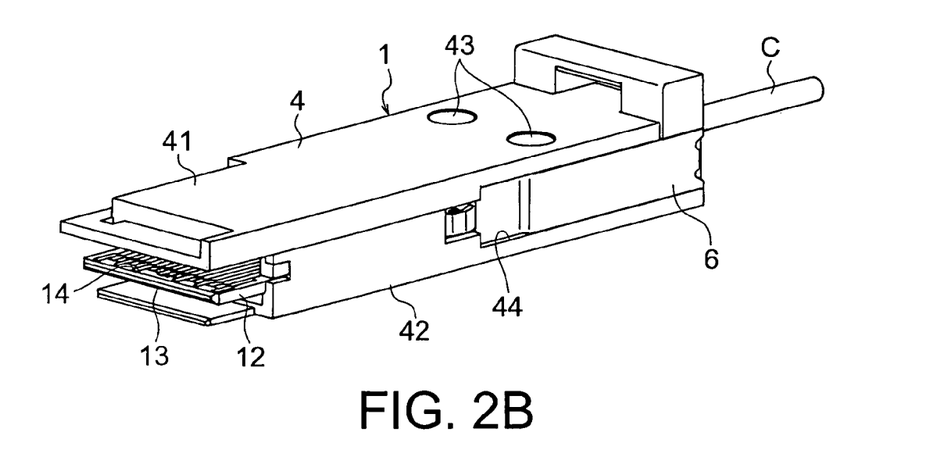
FIG. 2B is a perspective view, as seen in a different direction, of the transceiver connector of FIG. 2A.
Figure 2C:
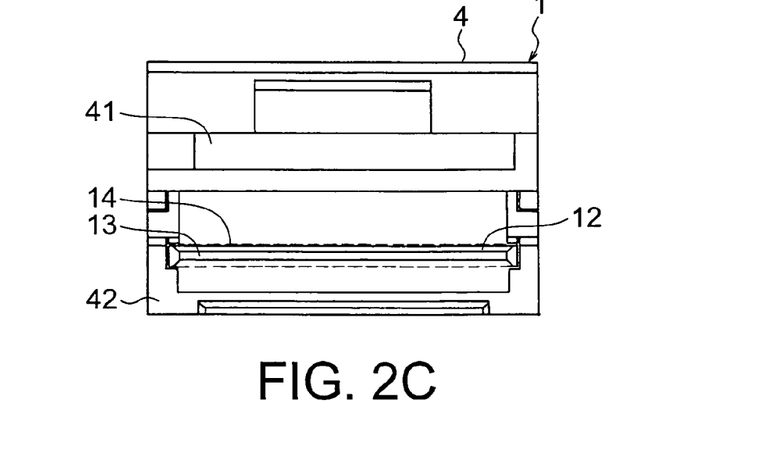
FIG. 2C is a front view of the transceiver connector shown in FIGS. 2A and 2B.

Next, referring also to FIGS. 2A to 2C, a connector according to an exemplary embodiment of this invention will be described using a transceiver connector.

The transceiver connector is generally designated by reference symbol 1 and electrically connected to the mating connector 2 by being fitted into the metal shell 21 thereof and has a locking mechanism for locking the fitted state by engaging the latches 3 projecting into the metal shell 21.

The transceiver connector 1 comprises a metal hood 4 serving as a housing, a circuit board 12 received and held in the metal hood 4, and levers 6 assembled to left and right side surfaces of the metal hood 4, respectively. The metal hood 4 comprises an upper hood 41 and a lower hood 42 which are vertically stacked one on the other and screwed by screws 43 so as to be integrated together. The upper hood 41 and the lower hood 42 are individually formed into predetermined shapes by a method such as die cast. The metal hood 4 has, in its left and right side surfaces, lever holding grooves 44 for receiving and holding the levers 6 so as to be slidable forward and rearward.

The circuit board 12 is received and held in an inner space of the metal hood 4 and has one end connected to a cable C introduced into the inner space from a rear end of the metal hood 4 and the other end projecting to the outside from a front end of the metal hood 4 to form a connector portion 13. A plurality of conductive terminals 14 for electrical connection to the mating connector 2 are formed by conductive patterns on upper and lower surfaces of the connector portion 13. The circuit board 12 is mounted with electrical elements (not illustrated) for processing input/output signals transferred to the connector portion 13 from the cable C.

Figure 3:
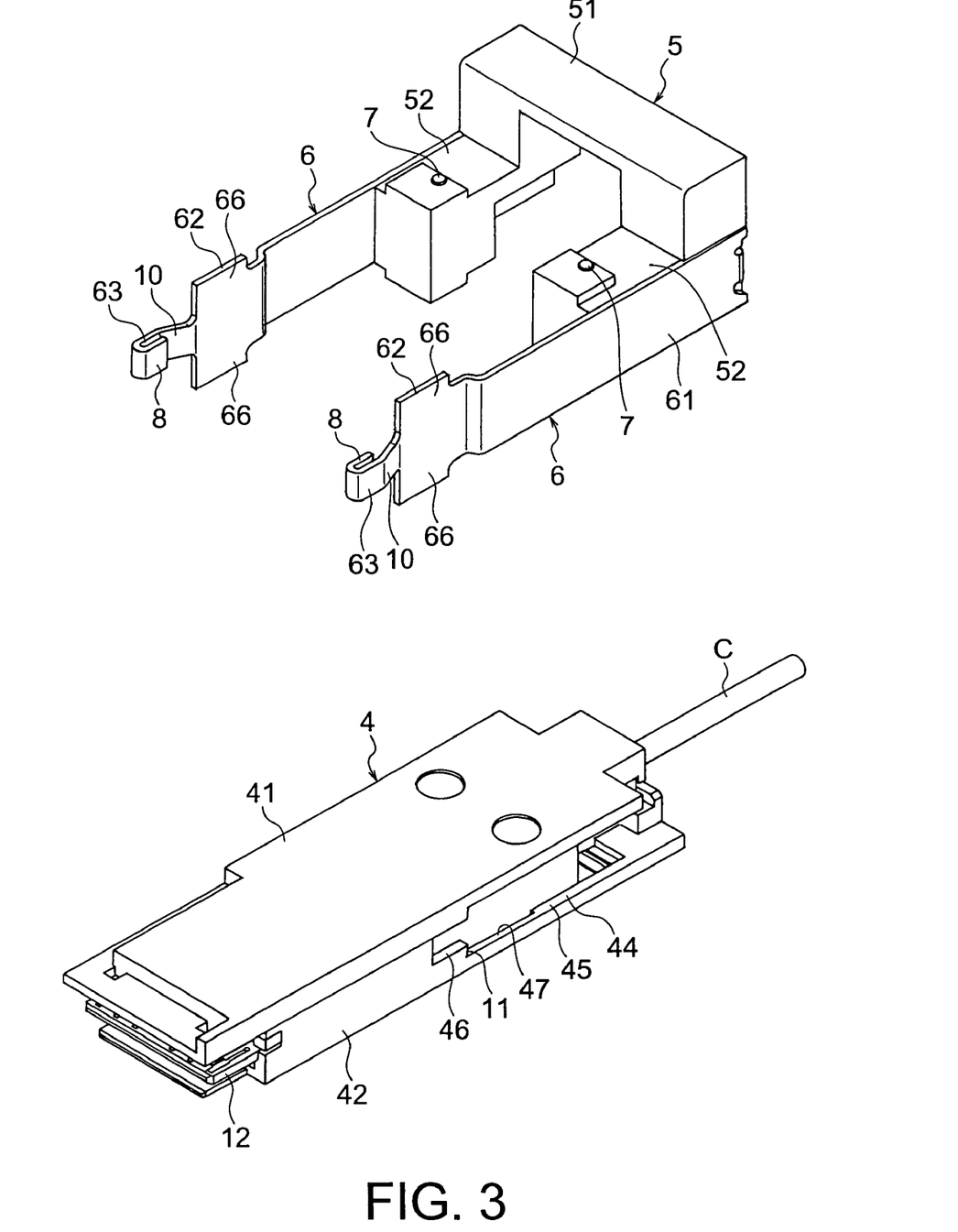
FIG. 3 is an exploded perspective view of the transceiver connector shown in FIGS. 2A to 2C.
Figure 4:
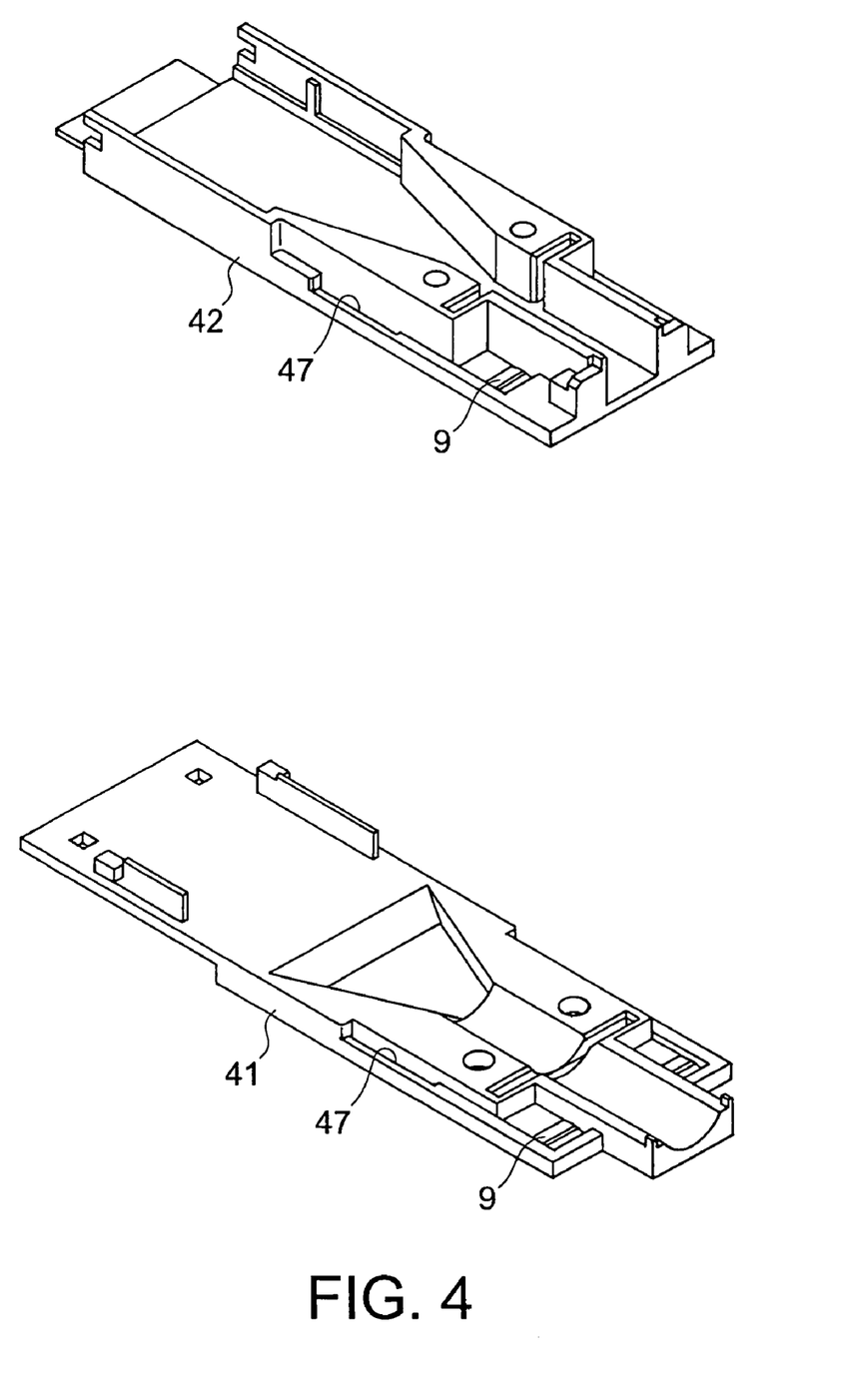
FIG. 4 is an exploded perspective view of a housing included in the transceiver connector shown in FIGS. 2A to 2C.
Figure 5:
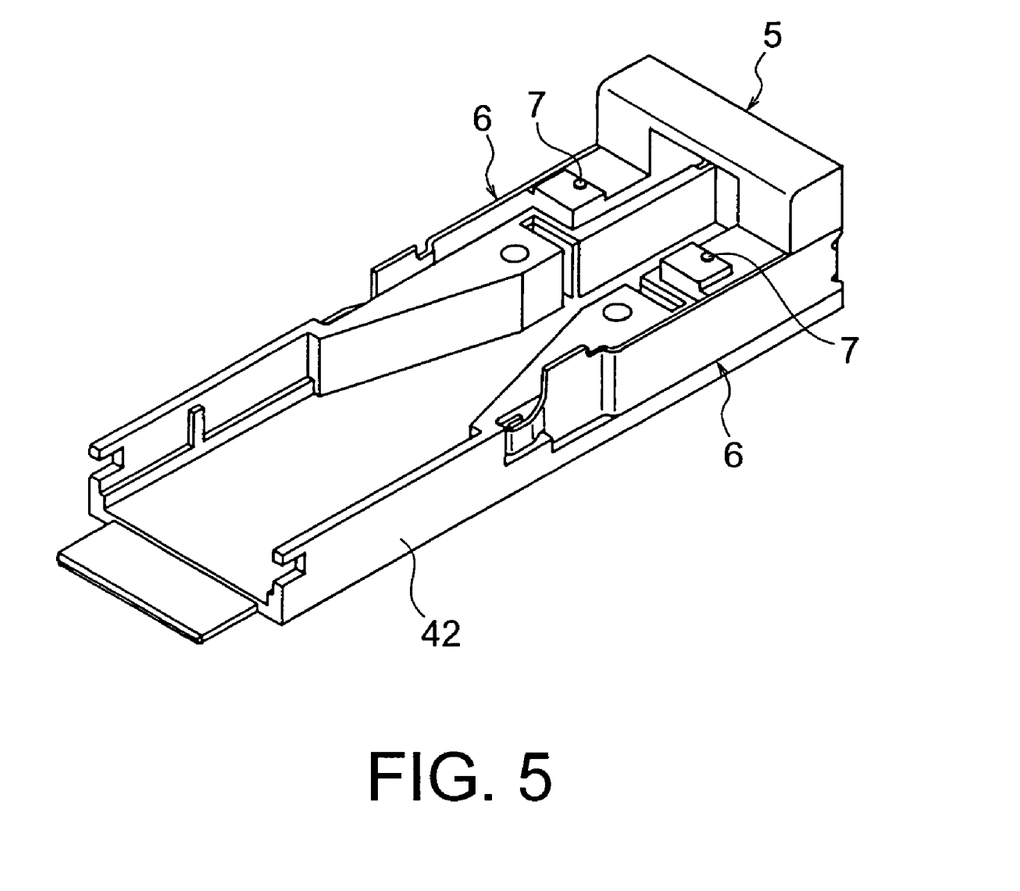
FIG. 5 is a perspective view showing a state where some components of the transceiver connector shown in FIGS. 2A to 2C are removed.

Referring also to FIGS. 3 to 5, the metal hood 4 and the levers 6 will be described.

Each lever 6 has a long plate shape long in the forward/rearward direction and is formed by punching and bending a metal plate. The lever 6 has a body portion 61, a recess portion 62, and a latch driving convex portion 63 arranged in this order from the rear side to the front side. Further, the lever 6 integrally has a support piece 8 which is folded rearward from a front end of the latch driving convex portion 63. An inclined surface 10 is formed at a rear end portion (portion continuous with the recess portion 62) of the latch driving convex portion 63. The latch driving convex portion 63 (including the inclined surface 10) and the support piece 8 are narrower than the body portion 61 and the recess portion 62 and the recess portion 62 is formed with projecting pieces 66 along upper and lower lines thereof, respectively.

On the other hand, each lever holding groove 44 is opened rearward of the metal hood 4 and has a wide groove portion 45 for receiving the body portion 61 and the recess portion 62 and a narrow groove portion 46 for receiving the latch driving convex portion 63 (including the inclined surface 10) and the support piece 8. A front end face, forming a boundary with the narrow groove portion 46, of the wide groove portion 45 forms a locking stepped portion 11 for engagement with the latch 3 of the mating connector 2. An upper wall surface and a lower wall surface of a portion, for receiving the recess portion 62, of the wide groove portion 45 respectively have projecting piece guide grooves 47 for receiving the upper and lower projecting pieces 66 so as to guide the lever 6 to slide forward and rearward.

By inserting the upper and lower projecting pieces 66 of the lever 6 into the projecting piece guide grooves 47, the lever 6 is held to be slidable forward and rearward in a predetermined range in the lever holding groove 44 and is prevented from coming off the lever holding groove 44.

The recess portion 62 and the support piece 8 of the lever 6 contact and slide on a bottom wall surface of the lever holding groove 44. The body portion 61 and the latch driving convex portion 63 of the lever 6 are approximately flush with a corresponding one of the left and right side surfaces of the metal hood 4. The recess portion 62 is recessed from the corresponding left or right side surface of the metal hood 4 so that a free end of the latch 3 is engageable with the locking stepped portion 11 over the recess portion 62.

The lever 6 is slidable between a pushed position where the latch driving convex portion 63 (including the inclined surface 10) is completely received in the narrow groove portion 46 and a drawn-out position where the lever 6 is forced to slide rearward so that a rear half (including the inclined surface 10) of the latch driving convex portion 63 is drawn out into the wide groove portion 45 and a front half thereof remains in the narrow groove portion 46.

Rear end portions of the levers 6 received in the left and right lever holding grooves 44 are coupled together by a plastic operating member 5 which is used for forward and rearward slide operations of the levers 6. The levers 6 and the operating member 5 are coupled together by, for example, press fitting.

The operating member 5 is assembled to the rear end of the metal hood 4 so as to be movable forward and rearward and comprises an operating portion 51 projecting upward of the metal hood 4 and arm portions 52 entering a hollow portion of the metal hood 4 to guide the operating member 5 forward and rearward. Positioning projections 7 are provided on upper and lower surfaces of each of the arm portions 52, respectively.

Positioning projections 9 are provided on upper and lower inner wall surfaces, facing the positioning projections 7, in the hollow portion of the metal hood 4. The positioning projections 7 and the positioning projections 9 cooperatively form a positioning means such that when the operating member 5 is operated to move forward or rearward, the positioning projections 7 elastically ride across the positioning projections 9 so as to be positioned forward or rearward of the positioning projections 9, thereby selectively positioning the levers 6 at the above-mentioned pushed position or the above-mentioned drawn-out position in the lever holding grooves 44.

The operating member 51 and the levers 6 may be integrally formed from a metal plate.

Next, referring also to FIGS. 6 to 11B, a description will be given of fitting and detaching operations and locking and lock releasing operations for the transceiver connector 1 and the mating connector 2.

The transceiver connector 1 in which the levers 6 are positioned at the pushed position is placed so as to face the mating connector 2 and then is inserted and fitted into the fitting hole 22 of the mating connector 2. Then, the free ends of the latches 3 ride over the side surfaces of the metal hood 4 so as to be elastically bent outward and relatively move rearward on the side surfaces of the metal hood 4. Herein, the width and position of each latch 3 are set so that the free end of the latch 3 moves so as to ride over both the latch driving convex portion 63 and the side surface of the metal hood 4 at the narrow groove portion 46 where the latch driving convex portion 63 is received.

In this transceiver connector 1, the width of each latch 3 is set to be approximately equal to that of the latch driving convex portion 63 and the positions of the latch 3 and the latch driving convex portion 63 (and the narrow groove portion 46) are slightly offset vertically from each other so that the free end of the latch 3 rides over both the latch driving convex portion 63 and the side surface of the metal hood 4. However, it may alternatively be configured that the width of each latch 3 is set to be greater than that of the narrow groove portion 46 (and smaller than that of the wide groove portion 45) to allow the free end of the latch 3 to ride over both the latch driving convex portion 63 and the side surface of the metal hood 4.

Figure 6:
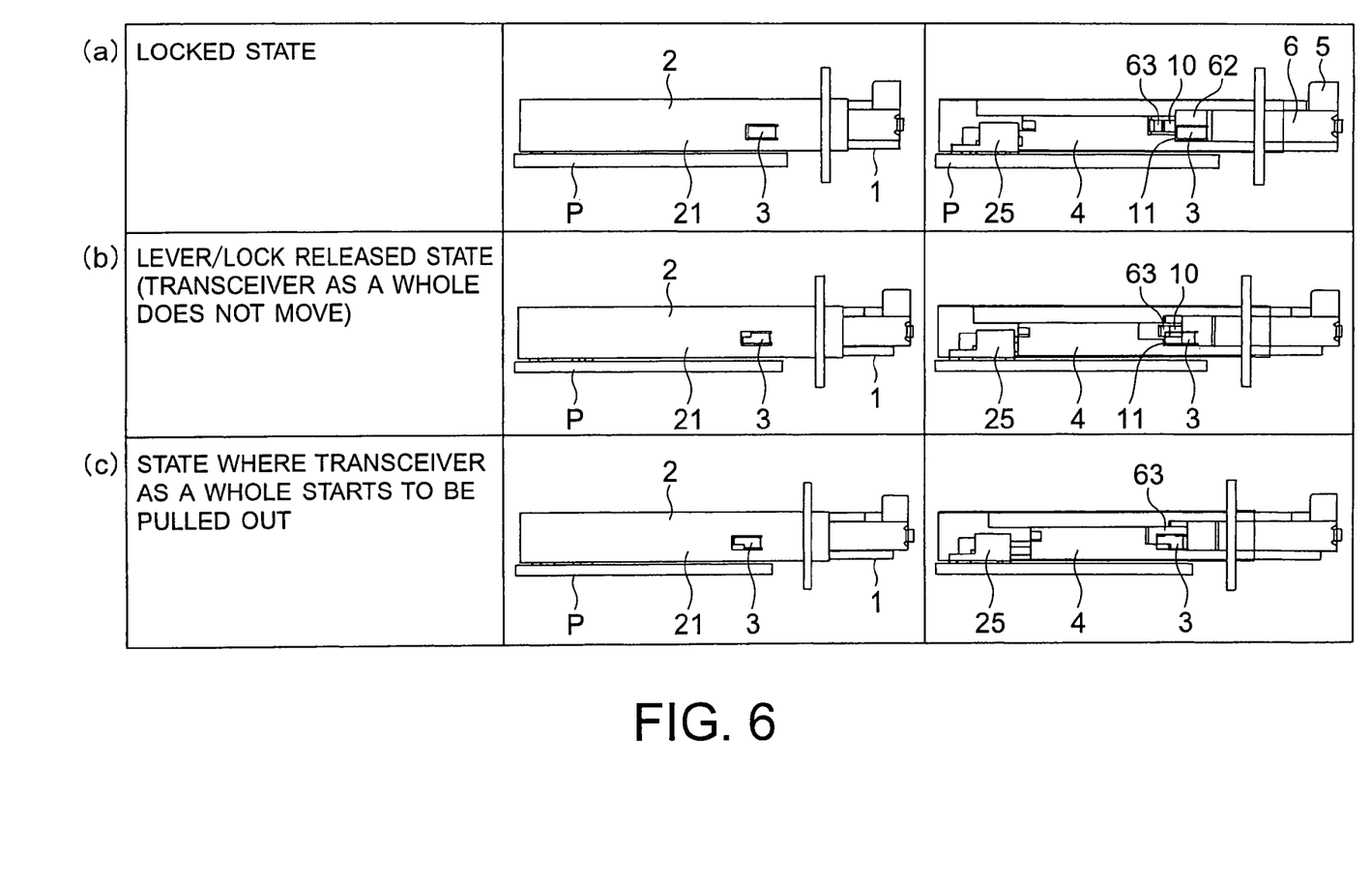
FIG. 6 is an operation explaining view about fitting and detachment between the mating connector and the transceiver connector (a side wall portion of the mating connector is removed in right diagrams)
Figure 7:
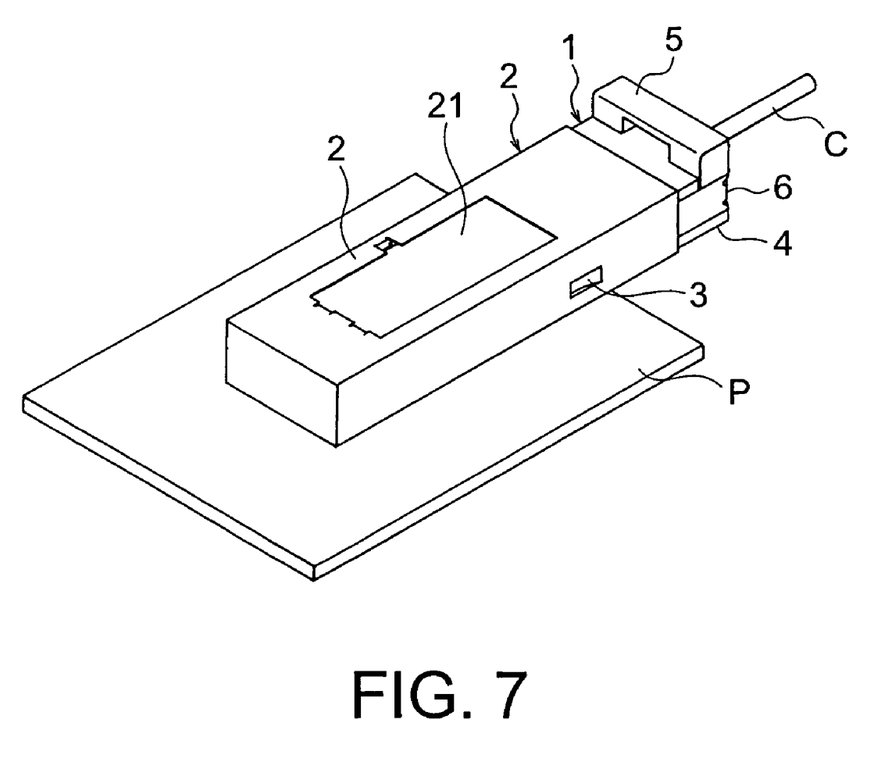
FIG. 7 is a perspective view showing a fitted state where the transceiver connector is inserted and fitted into the mating connector.
Figure 8:
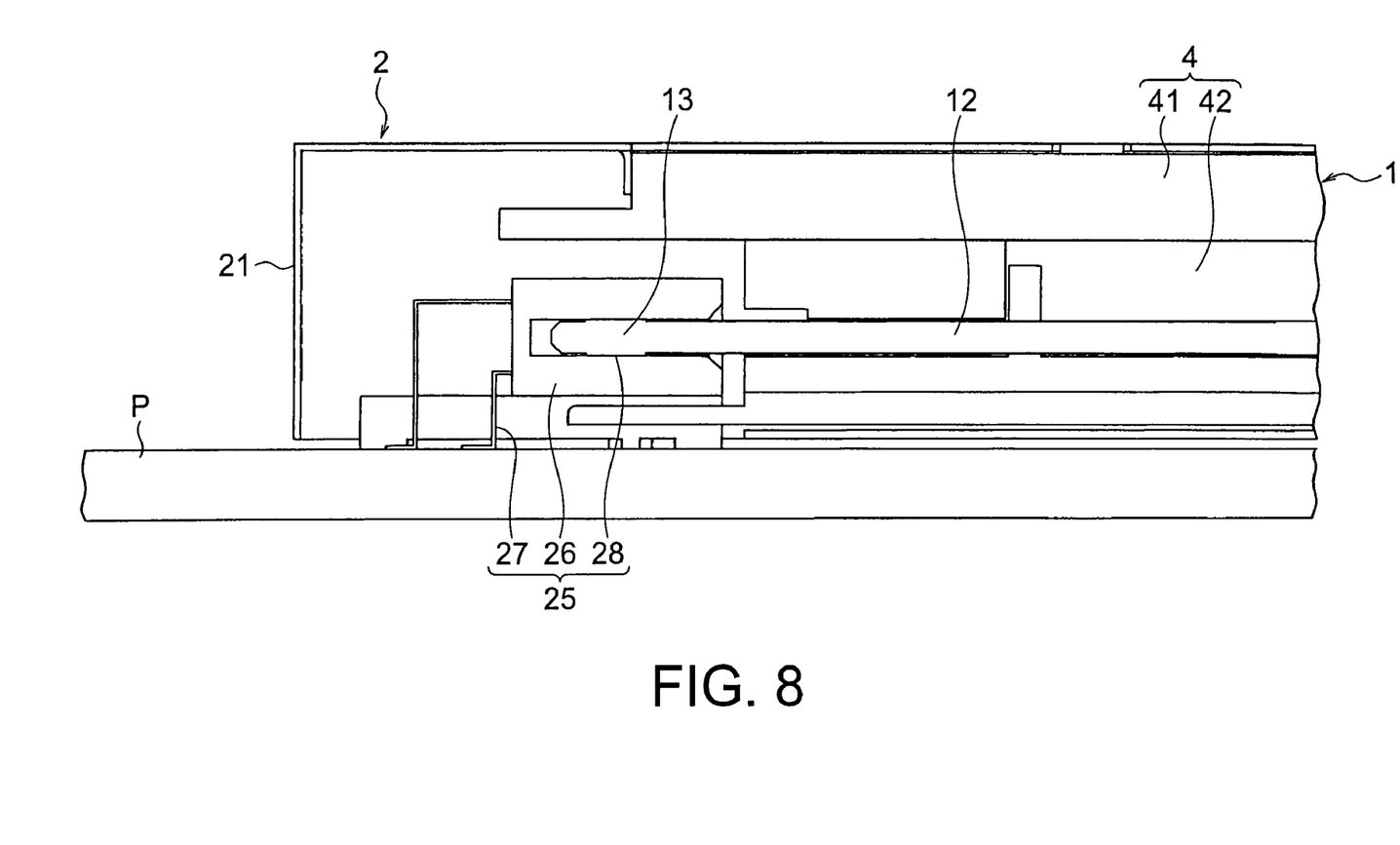
FIG. 8 is an enlarged sectional view of only the main part in the fitted state of FIG. 7.
Figure 9A:
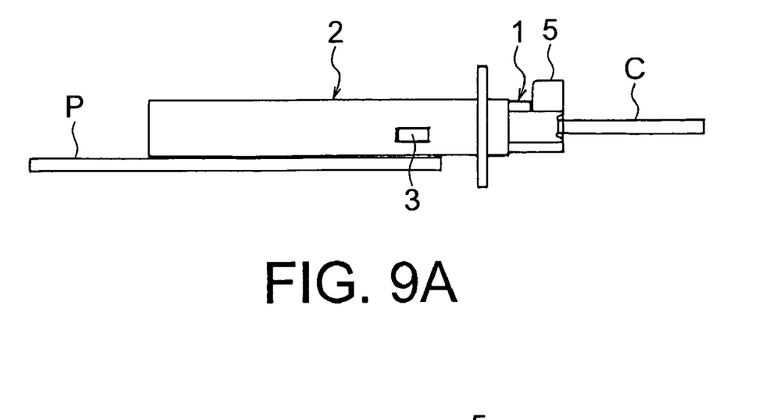
FIG. 9A is a side view showing the fitted state of FIG. 7.
Figure 9B:
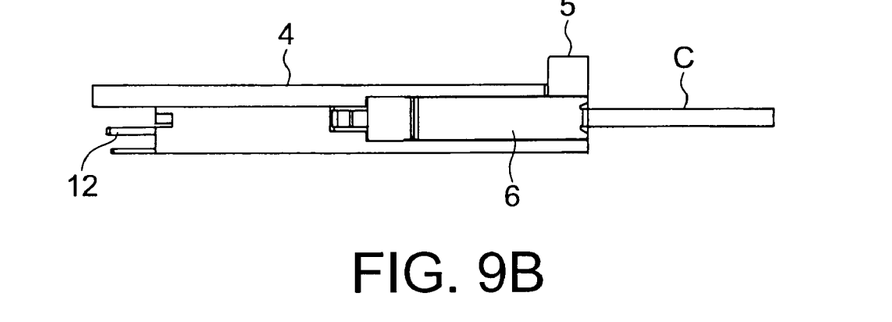
FIG. 9B is a side view showing only the transceiver connector in the state of FIG. 9A.
Figure 9C:
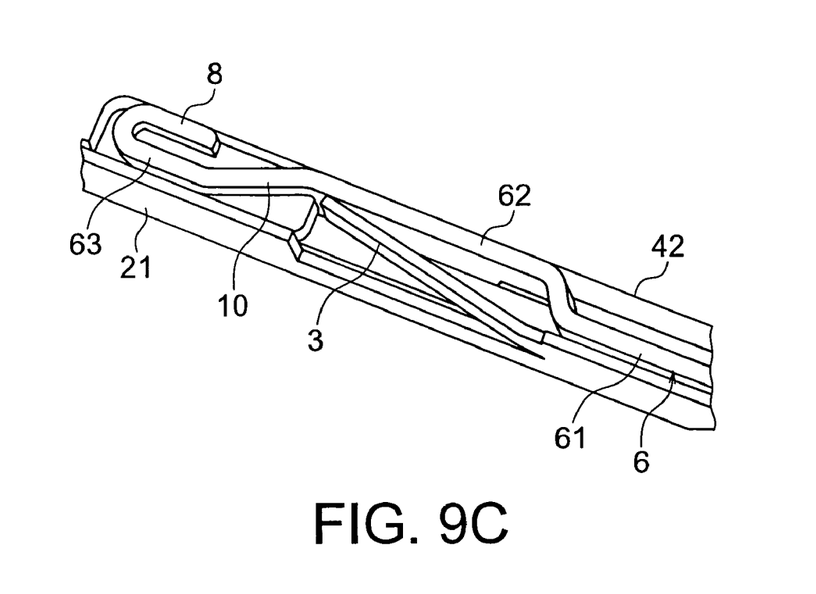
FIG. 9C is an enlarged perspective view of only the main part in the state of FIG. 9A.
Figure 11A:
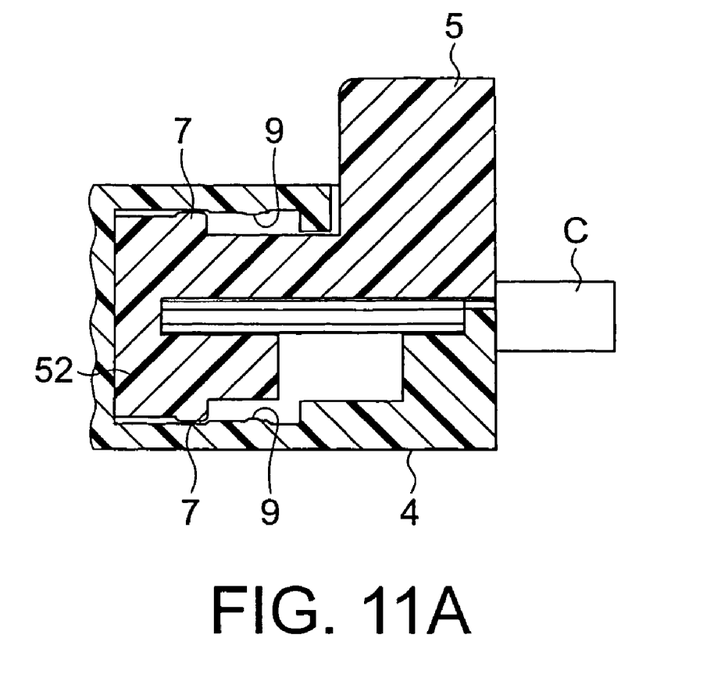
FIG. 11A is a main part enlarged sectional view in a state shown at (a) in FIG. 6.

When the transceiver connector 1 reaches a completely fitted position at the deep portion of the fitting hole 22 of the mating connector 2 as shown in FIGS. 7 and 8, the connector portion 13 is inserted into the fitting groove 28 of the connector portion 25 so that the conductive terminals 14 are brought into contact with the contacts 27 to be electrically connected thereto. Simultaneously, the latches 3 reach the wide groove portions 45 of the lever holding grooves 44 to restore their original shape due to their elastic restoring force and thus the free ends of the latches 3 enter or fall into the wide groove portions 45. Accordingly, the free ends of the latches 3 engage the locking stepped portions 11 of the wide groove portions 45 in a detaching direction of the transceiver connector 1. Thus, a locked state shown at (a) in FIG. 6 is reached. In this event, the free end of each latch 3 is located on the recess portion 62 of the lever 6 as shown in FIGS. 9A to 9C. Further, since, as shown in FIG. 11A, the positioning projections 7 provided on the arm portions 52 of the operating member 5 are located forward of the positioning projections 9 of the metal hood 4, the levers 6 are positioned at the above-mentioned pushed position, i.e. a non-engagement-releasable position, in the lever holding grooves 44.

Figure 10A:
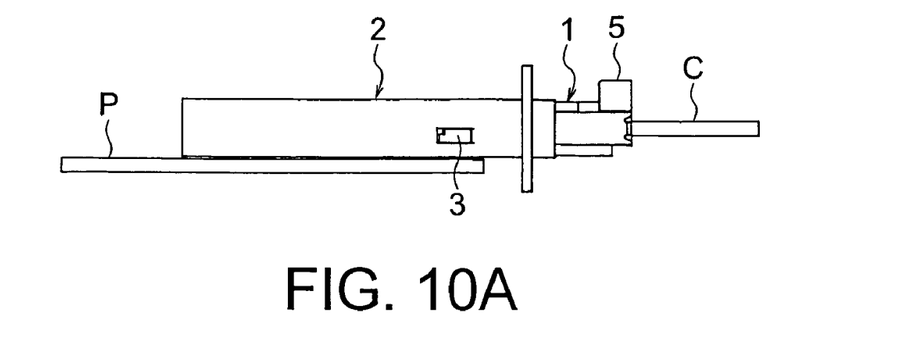
FIG. 10A is a side view showing a state where levers are pulled in the fitted state of FIG. 7.
Figure 10B:
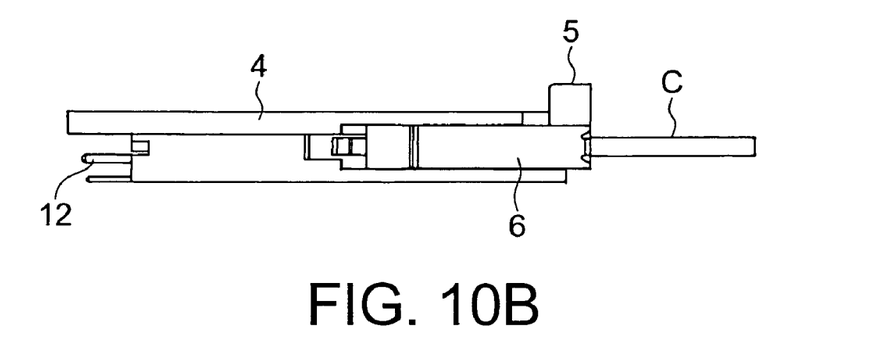
FIG. 10B is a side view showing only the transceiver connector in the state of FIG. 10A.
Figure 10C:
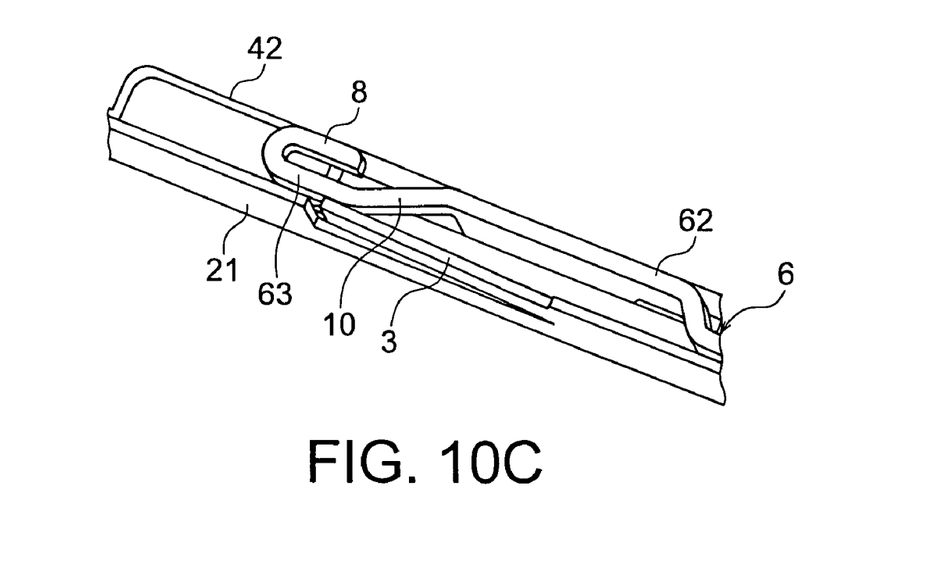
FIG. 10C is an enlarged perspective view of only the main part in the state of FIG. 10A.

For releasing the locked state, the operating member 5 is grasped by fingers to move the levers 6 to the above-mentioned drawn-out position. Then, the rear half of each latch driving convex portion 63 projects into the wide groove portion 45 from the narrow groove portion 46. During this projecting process, the free end of each latch 3 elastically rides over the latch driving convex portion 63, as shown in FIGS. 10A to 10C, passing through the inclined surface 10 from the recess portion 62, and is released from the engagement with the locking stepped portion 11. Accordingly, a lock released state is reached as shown at (b) in FIG. 6. That is, the inclined surface 10 and the latch driving convex portion 63 cooperatively serve as an engagement releasing portion. In this event, the latch driving convex portion 63 receives an elastic restoring force of the latch 3 due to its flexure, but since the latch driving convex portion 63 is supported by the support piece 8, it does not deform. Further, since the positioning projections 7 provided on the arm portions 52 of the operating member 5 ride across the positioning projections 9 of the metal hood 4 so as to be located rearward of the positioning projections 9 as shown in FIG. 11B, the levers 6 are positioned at the above-mentioned drawn-out position, i.e. an engagement released position, in the lever holding grooves 44.

Thereafter, the transceiver connector 1 is pulled in the detaching direction. In this event, the free end of each latch 3 moves from the rear half to the front half of the latch driving convex portion 63, but since the front half of the latch driving convex portion 63 remains in the narrow groove portion 46, the free end of the latch 3 rides over the side surface of the metal hood 4 during that moving process. Therefore, as shown at (c) in FIG. 6, by pulling out the transceiver connector 1 in the state as it is, the transceiver connector 1 can be detached from the mating connector 2.

Referring to FIGS. 12 to 15B, a modification of the lever positioning means will be described.

Figure 11B:
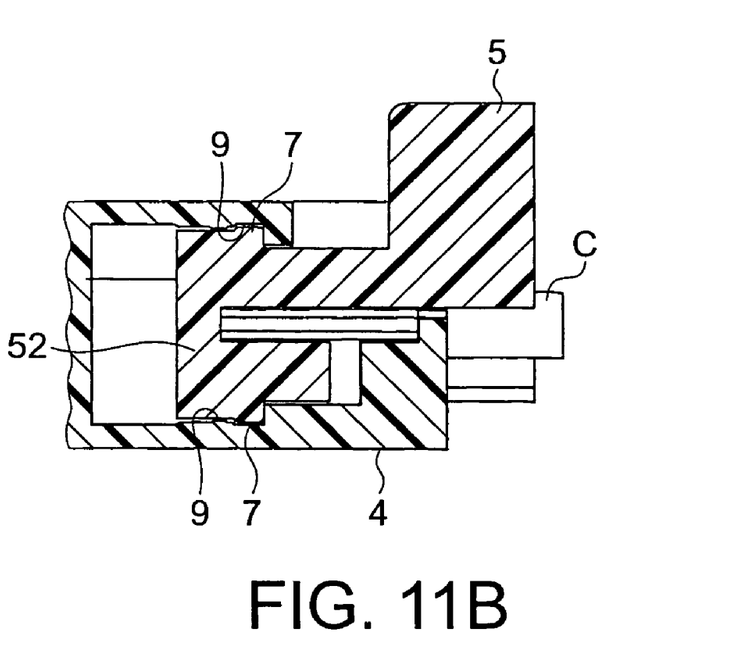
FIG. 11B is a main part enlarged sectional view in a state shown at (b) in FIG. 6.
Figure 12:
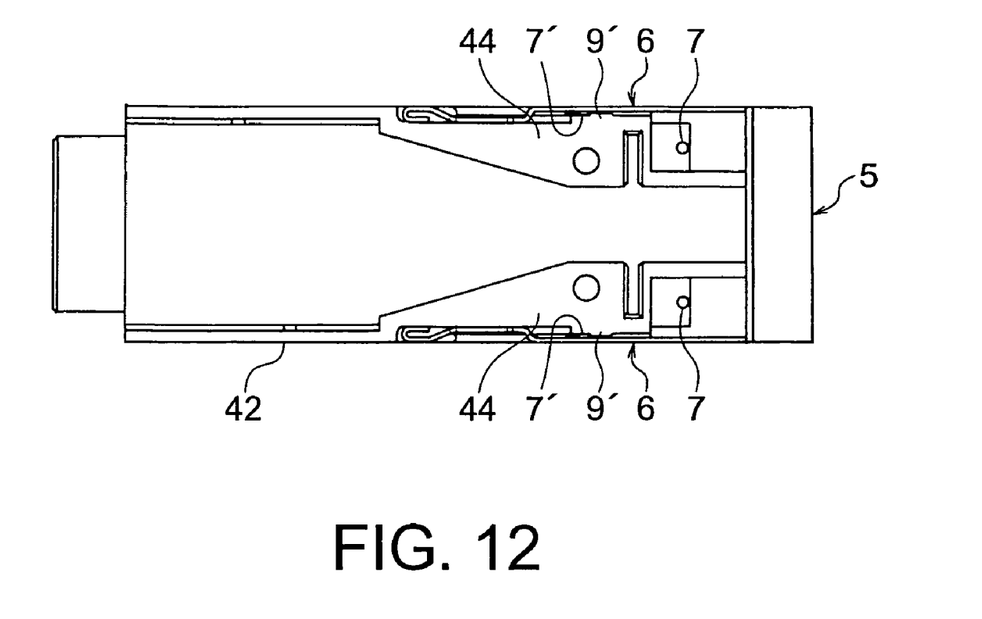
FIG. 12 is a plan view showing a modification of a lever positioning means.
Figure 13:
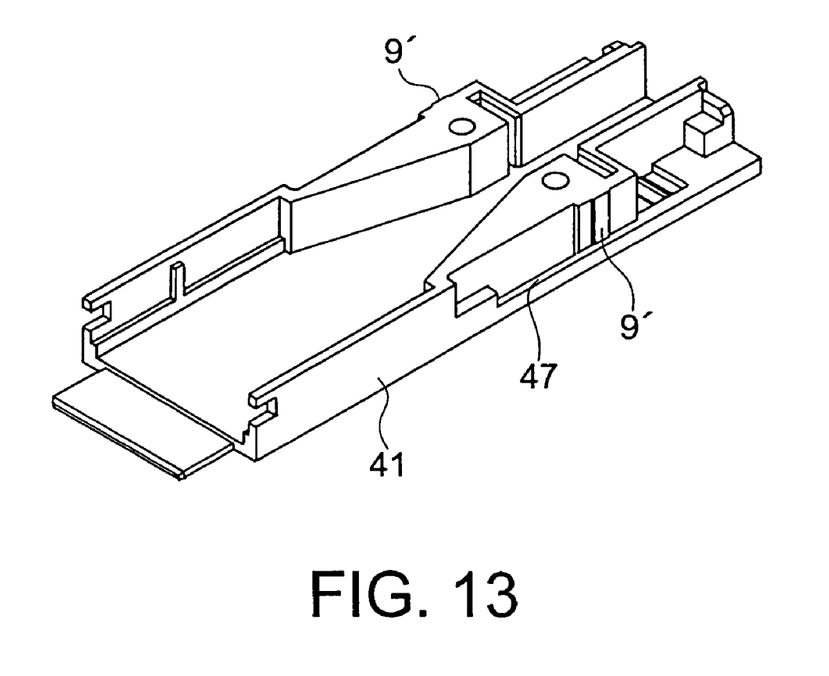
FIG. 13 is a perspective view of part of a housing used in the modification shown in FIG. 12.
Figure 14:
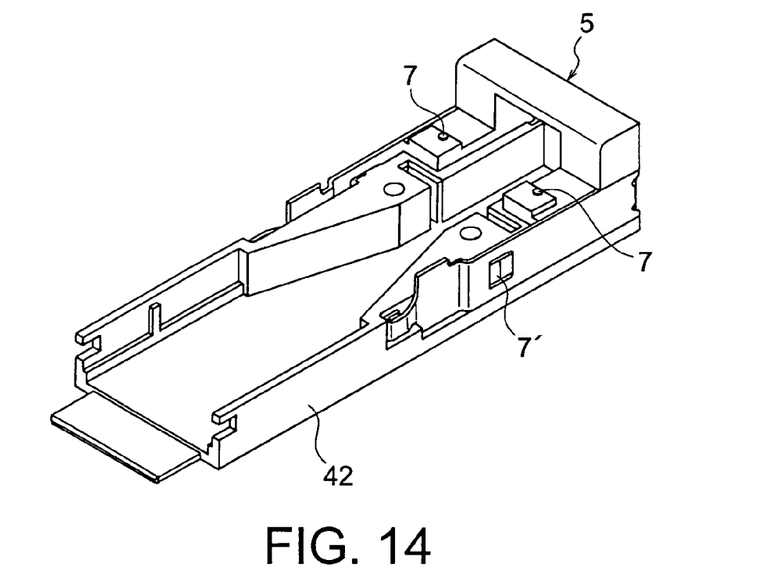
FIG. 14 is a perspective view showing a state where some components are removed from the modification shown in FIG. 12.

In the above-mentioned transceiver connector 1, as shown in FIGS. 11A and 11B, the positioning projections 7 of the operating member 5 and the positioning projections 9 in the hollow portion of the metal hood 4 are provided as the positioning means for the levers 6 at the pushed position and the drawn-out position. Instead of them or in addition to them, there may be provided positioning projections 7' of the levers 6 and positioning projections 9' of the lever holding grooves 44 of the metal hood 4 as shown in FIGS. 12 to 14.

Figure 15A:
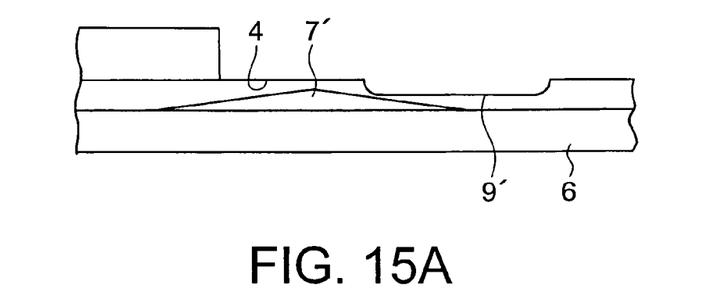
FIG. 15A is an operation explaining view similar to FIG. 11A when the lever positioning means of FIG. 12 is used.
Figure 15B:
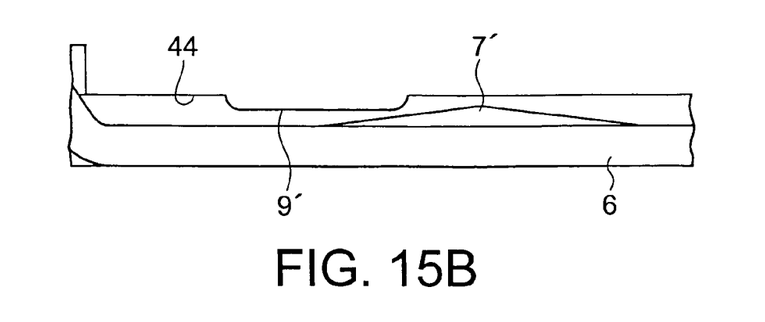
FIG. 15B is an operation explaining view similar to FIG. 11B when the lever positioning means of FIG. 12 is used.

In this case, in the locked state shown at (a) in FIG. 6, as shown in FIG. 15A, the positioning projections 7' provided on the levers 6 are located forward of the positioning projections 9' of the metal hood 4 so that the levers 6 are positioned at the above-mentioned pushed position in the lever holding grooves 44, while, in the lock released state shown at (b) in FIG. 6, as shown in FIG. 15B, the positioning projections 7' provided on the levers 6 are located rearward of the positioning projections 9' of the metal hood 4 so that the levers 6 are positioned at the above-mentioned drawn-out position in the lever holding grooves 44.

According to the transceiver connector 1, the number of components for the locking mechanism is small and the structures and mechanisms of the respective components are simple, and therefore, it is possible to reduce the production cost.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims. For example, this invention can be widely applied to plug-type connectors.

What is claimed is:

1. A connector adapted to be connected to a mating connector having a fitting hole and a latch, the connector comprising:
   a housing configured to be insertable into the fitting hole in an inserting direction; and
   a lever formed from a single metal plate and slidable with respect to the housing in the inserting direction and a detaching direction opposite to the inserting direction,
   wherein the housing has a locking stepped portion adapted to engage the latch in the detaching direction,
   wherein the lever comprises:
   an engagement releasing portion adapted to release engagement between the latch and the locking stepped portion by sliding of the lever; and a support piece continuous from the engagement releasing portion, folded back, and supported by the housing;

wherein the housing has side surfaces facing each other in a direction perpendicular to the inserting direction, the lever is provided at each of the side surfaces of the housing, and the levers are coupled together by an operating member;

wherein positioning means for selectively positioning the lever at an engagement released position and a non-engagement-releasable position is provided on facing surfaces of at least one of the operating member and the lever and the housing; and wherein the positioning means comprises:

a first projection provided on one of at least one of the operating member and the lever and the housing, and a second projection provided on the other of at least one of the operating member and the lever and the housing, and wherein the first projection elastically rides across the second projection so as to be located on one side or the other side of the second projection, thereby positioning the lever at the engagement released position or the non-engagement-releasable position.

2. The connector according to claim 1, wherein the engagement releasing portion is provided at end portion in the inserting direction and the support piece is folded back from the engagement releasing portion to extend in the detaching direction.

3. The connector according to claim 1, wherein the latch projects into the fitting hole from a side surface of a housing of the mating connector, the engagement releasing portion has a latch driving convex portion formed from the metal plate, and the latch driving convex portion drives the latch outward by the sliding of the lever to release the engagement between the latch and the locking stepped portion.

4. The connector according to claim 3, wherein the latch driving convex portion has an inclined surface at one end portion thereof.

5. The connector according to claim 1, wherein the housing has a lever holding groove extending in the inserting direction and the lever is received in the lever holding groove.

6. The connector according to claim 1, wherein the engagement releasing portion is provided at one end portion in the inserting direction and the operating member is provided at the other end portion in the inserting direction.

\* \* \* \* \*